US011118610B2

(12) United States Patent  
Blanding et al.

(10) Patent No.: US 11,118,610 B2  
(45) Date of Patent: Sep. 14, 2021

(54) LOW PROFILE ELECTRO-HYDROSTATIC ACTUATOR

(71) Applicant: The Boeing Company, Chicago, IL (US)

(72) Inventors: David E. Blanding, Belton, SC (US); Jeffrey C. Coffman, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 187 days.

(21) Appl. No.: 15/689,862

(22) Filed: Aug. 29, 2017

(65) Prior Publication Data

US 2019/0063472 A1 Feb. 28, 2019

(51) Int. Cl.
*F15B 15/18* (2006.01)
*F15B 1/26* (2006.01)
(Continued)

(52) U.S. Cl.
CPC .............. *F15B 15/18* (2013.01); *B64C 13/40* (2013.01); *B64C 13/504* (2018.01); *B64C 25/22* (2013.01);
(Continued)

(58) Field of Classification Search
CPC .... B64C 13/504; F15B 15/18; F15B 2215/00; F15B 2215/30; F15B 2211/20515;
(Continued)

(56) References Cited

U.S. PATENT DOCUMENTS 3,166,016 A * 1/1965 Thoma .................. F01B 3/0035  
    91/483  
3,556,151 A * 1/1971 Masuda .............. F16K 11/0743  
    137/625.21  
(Continued)

FOREIGN PATENT DOCUMENTS

WO      0016464 A2    3/2000

OTHER PUBLICATIONS

European Application Serial No. 18189809.9, Office Action dated Mar. 23, 2020, 7 pgs.
(Continued)

*Primary Examiner* — Dustin T Nguyen  
(74) *Attorney, Agent, or Firm* — Kwan & Olynick LLP (57) ABSTRACT

In general, certain embodiments of the present disclosure provide an electro-hydrostatic actuator comprising a piston assembly and a hydraulic cylinder. The piston assembly, having a piston head and a piston rod extending from the piston head, is located and movable within the hydraulic cylinder. The hydraulic cylinder includes a hydraulic fluid chamber region including a piston side chamber and a rod side chamber, a reservoir for storing hydraulic fluid located within the hydraulic cylinder which is in fluid communication with the hydraulic fluid chamber region. The electro-hydrostatic actuator includes a hydraulic pump system for moving hydraulic fluid in the reservoir and the hydraulic fluid chamber region, the hydraulic pump system in fluid communication with a flow control network in a hydraulic cylinder boss for controlling a direction and flow magnitude of hydraulic fluid within the hydraulic fluid chamber region, and an electric motor for driving the hydraulic pump system.

34 Claims, 7 Drawing Sheets

(51) Int. Cl.
  *F15B 15/14* (2006.01)
  *F15B 21/08* (2006.01)
  *F15B 1/02* (2006.01)
  *B64C 13/40* (2006.01)
  *F04B 1/20* (2020.01)
  *F04B 1/324* (2020.01)
  *B64C 13/50* (2006.01)
  *B64C 25/22* (2006.01)
  *F04B 1/2042* (2020.01)
  *F04B 17/03* (2006.01)
  *F04B 1/328* (2020.01)
  *F15B 1/10* (2006.01)
  *F03C 1/40* (2006.01)
  *F15B 7/00* (2006.01)

(52) U.S. Cl.
  CPC .............. *F04B 1/20* (2013.01); *F04B 1/2042* (2013.01); *F04B 1/324* (2013.01); *F04B 1/328* (2013.01); *F04B 17/03* (2013.01); *F15B 1/02* (2013.01); *F15B 1/26* (2013.01); *F15B 15/1428* (2013.01); *F15B 15/1447* (2013.01); *F15B 21/08* (2013.01); *F03C 1/0678* (2013.01); *F15B 1/103* (2013.01); *F15B 1/265* (2013.01); *F15B 7/006* (2013.01); *F15B 15/1485* (2013.01); *F15B 2211/20515* (2013.01); *F15B 2211/20538* (2013.01); *F15B 2211/20546* (2013.01); *F15B 2211/20561* (2013.01); *F15B 2211/27* (2013.01); *F15B 2211/3058* (2013.01); *F15B 2211/329* (2013.01); *F15B 2211/62* (2013.01); *F15B 2211/633* (2013.01); *F15B 2211/6333* (2013.01); *F15B 2211/6336* (2013.01); *F15B 2211/6651* (2013.01); *F15B 2211/7053* (2013.01); *F15B 2211/8609* (2013.01); *F15B 2211/8757* (2013.01)

(58) Field of Classification Search
  CPC ........ F15B 2211/20561; F15B 2211/27; F15B 2211/3058
  USPC ............................................. 60/476
  See application file for complete search history.

(56) References Cited

U.S. PATENT DOCUMENTS

| | | | | |
|---|---|---|---|---|
| 3,868,062 | A | * | 2/1975 | Cunningham .......... B02C 18/24 |
| | | | | 241/236 |
| 4,858,898 | A | * | 8/1989 | Niikura .................. B60G 15/12 |
| | | | | 267/218 |
| 5,109,672 | A | * | 5/1992 | Chenoweth ............. B64C 13/40 |
| | | | | 60/456 |
| 6,796,120 | B2 | * | 9/2004 | Franchet ................. F15B 7/006 |
| | | | | 60/413 |
| 7,434,395 | B2 | | 10/2008 | He |
| 8,341,956 | B2 | * | 1/2013 | Makino ................. F04B 49/002 |
| | | | | 60/394 |
| 9,458,864 | B2 | * | 10/2016 | Hyon .................... F15B 13/021 |
| 9,562,547 | B2 | | 2/2017 | Staab et al. |
| 2008/0010984 | A1 | | 1/2008 | Arbel et al. |
| 2008/0236156 | A1 | | 10/2008 | Kakino et al. |
| 2014/0366522 | A1 | * | 12/2014 | Masutani ................ F15B 15/18 |
| | | | | 60/477 |

OTHER PUBLICATIONS

European Application Serial No. 18189809.9, Office Action dated Dec. 19, 2020, 11 pgs.

Canadian Application Serial No. 3,003,277, Office Action dated May 20, 2021, 12 pgs.

* cited by examiner

LOW PROFILE ELECTRO-HYDROSTATIC ACTUATOR

TECHNICAL FIELD

The present disclosure relates generally to fluid pressure actuators and, more specifically, to electro-hydrostatic actuators.

BACKGROUND

Electro-Hydraulic actuators (EHAs) are known to power aircraft operations such as flight control surfaces, landing gear retraction or extension, steering or braking, as well as lifting mechanisms for various vehicles. A typical EHA system includes multiple components, for example, an electric motor that drives a hydraulic pump to move hydraulic fluid from a reservoir to a hydraulic cylinder for actuating the actuator. However, current component based EHA systems are bulky in size, heavy in weight, incurring higher cost at manufacturing and requiring assembly and plumbing at the installation.

Thus, there exists a need for a low profile EHA containing all the components in one integrated package and yet providing enhanced component durability for elongated hydraulic operation life.

SUMMARY

The following presents a simplified summary of the disclosure in order to provide a basic understanding of certain embodiments of the present disclosure. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

In general, certain embodiments of the present disclosure provide electro-hydrostatic actuators. According to various embodiments, an electro-hydrostatic actuator is provided comprising a piston assembly having a piston head and a piston rod extending from the piston head, and a hydraulic cylinder, with the piston assembly located and movable within the hydraulic cylinder. The hydraulic cylinder includes a hydraulic fluid chamber region including a piston side chamber and a rod side chamber. The electro-hydrostatic actuator further comprises a reservoir for storing hydraulic fluid located within the hydraulic cylinder which is in fluid communication with the hydraulic fluid chamber region. The electro-hydrostatic actuator further comprises a hydraulic pump system for moving hydraulic fluid in the reservoir and the hydraulic fluid chamber region. The hydraulic pump system may be in fluid communication with a flow control network for controlling a direction and flow magnitude of hydraulic fluid within the hydraulic fluid chamber region. The electro-hydrostatic actuator further comprises an electric motor located within the hydraulic cylinder for driving the hydraulic pump system.

In some embodiments, the electro-hydrostatic actuator further comprises an integrated control module located within the hydraulic cylinder for receiving a control signal and converting the control signal into a set-point value at which the electric motor drives the hydraulic pump system. In some embodiments, the electric motor rotates a fixed or variable angle swash plate to drive the hydraulic pump system. In some embodiments, the direction of hydraulic fluid flow is determined by a direction of movement of the fixed or variable angle swash plate and the flow magnitude of the hydraulic fluid into the hydraulic fluid chamber region is controlled by an angle through which the swash plate is tilted.

In some embodiments, the electro-hydrostatic actuator further comprises an integrated control module located within the hydraulic cylinder for receiving a control electric signal which controls the direction of movement of the fixed or variable angle swash plate and the angle of tilt of the fixed or variable angle swash plate. In some embodiments, the hydraulic pump system comprises a hydraulic pump cylinder block which is rotatable within the electro-hydrostatic actuator. The hydraulic pump cylinder block may comprise a plurality of pistons which are movable by rotation of the fixed or variable angle swash plate. In some embodiments, the plurality of pistons are coupled to the swash plate and slide within the rotating hydraulic pump cylinder block along a direction of a center axis (X) of the electro-hydrostatic actuator.

In some embodiments, the electro-hydrostatic actuator further comprises a separating member located within the hydraulic cylinder which separates the reservoir into a compressed gas chamber area and a hydraulic fluid chamber area. In some embodiments, the separating member is a membrane. In some embodiments, the separating member has a bellow shape. In some embodiments, the separating member is movably disposed within the hydraulic cylinder.

In some embodiments, the piston assembly is moved in a first direction from a retracted position to an extended position by pumping hydraulic fluid from at least one of the rod side chamber and from the reservoir into the piston side chamber and pushes fluid from the rod side chamber into the reservoir. The piston assembly may additionally be moved in a second direction opposite to the first direction by pumping hydraulic fluid from at least one of the piston side chamber and the reservoir into the rod side chamber and pushing hydraulic fluid from the piston side chamber into the reservoir.

In some embodiments, the hydraulic pump system includes a valve plate. In some embodiments, a direction of the hydraulic fluid flow supplied by or returned to the hydraulic pump system is controlled by the valve plate. In some embodiments, the valve plate is mechanically attached to or integral with the hydraulic cylinder boss. In some embodiments, the valve plate is rotatable within the hydraulic cylinder boss. In some embodiments, the flow control network is integrated into the hydraulic cylinder boss.

In some embodiments, the electric motor is a servo motor and the hydraulic pump system is a bi-directional, positive displacement pump. In some embodiments, a position of the piston assembly within the hydraulic cylinder and output force produced by the piston assembly are controlled by modulating one of: a speed of the electric servo motor, a speed of the positive displacement pump, or a combination thereof. In some embodiments, a position of the piston assembly and output force are controlled by changing a speed and direction of the servo motor.

In some embodiments, the electro-hydrostatic actuator further comprises a thermal management system, the thermal management system disposed to surround thermal hot spots on an outer periphery of the actuator. In some embodiments, the electro-hydrostatic actuator further comprises a position sensor that monitors a position of the actuator, wherein at least one of a speed and a direction of the electric motor is controlled according to the position of the actuator.

In yet another embodiment of the present disclosure, an integrated accumulator and manifold system of a hydrostatic actuator is provided. According to various embodiments, the integrated accumulator and manifold system of a hydrostatic actuator comprises an inner surface surrounding an outer periphery of a housing of a hydraulic cylinder including a piston assembly, which has a piston head and a piston rod extending from the piston head. The housing may include a hydraulic fluid chamber region including a piston side chamber and a rod side chamber. The integrated accumulator and manifold system further comprises an outer surface defining a reservoir between the inner surface and the outer surface, wherein the reservoir is in fluid communication with the hydraulic fluid chamber region; and a fluid flow control network in fluid communication with a hydraulic pump system of the actuator for controlling a direction and flow magnitude of hydraulic fluid within the hydraulic fluid chamber region, wherein the hydraulic pump system moves hydraulic fluid in the reservoir and the hydraulic fluid chamber region.

In some embodiments, the fluid flow control network comprises a valve plate disposed interfacing the hydraulic pump system, the hydraulic fluid chamber region, and the reservoir. In some embodiments, the valve plate is operated to control a direction of a fluid flow from or to the hydraulic pump system without changing a direction of a motor which drives the hydraulic pump system.

In some embodiments, the integrated accumulator and manifold system further comprises a separating member located within the inner surface and the outer surface, the separating member separates the reservoir into a compressed gas chamber area and a hydraulic fluid chamber area. In some embodiments, the integrated accumulator and manifold system is integrated within the hydrostatic actuator.

In still yet another embodiment of the present disclosure, an aircraft is provided having an electro-hydrostatic actuator. According to various embodiments, the electro-hydrostatic actuator comprises a piston assembly having a piston head and a piston rod extending from the piston head. The electro-hydrostatic actuator may further comprise a hydraulic cylinder, with the piston assembly located and movable within the hydraulic cylinder. The hydraulic cylinder includes a hydraulic fluid chamber region including a piston side chamber and a rod side chamber. The electro-hydrostatic actuator further comprises a reservoir for storing hydraulic fluid located within the hydraulic cylinder which is in fluid communication with the hydraulic fluid chamber region. The electro-hydrostatic actuator may further comprise a hydraulic pump system for moving hydraulic fluid in the reservoir and the hydraulic fluid chamber region. The hydraulic pump system may be in fluid communication with a flow control network for controlling a direction and flow magnitude of hydraulic fluid within the hydraulic fluid chamber region. The electro-hydrostatic actuator may further comprise an electric motor located within the hydraulic cylinder for driving the hydraulic pump system. The electro-hydrostatic actuator may further comprise a valve plate rotatable within the hydraulic cylinder boss.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments of the present disclosure.

DETAILED DESCRIPTION OF PARTICULAR EMBODIMENTS

Reference will now be made in detail to some specific examples of the present disclosure including the best modes contemplated by the inventors for carrying out the present disclosure. Examples of these specific embodiments are illustrated in the accompanying drawings. While the present disclosure is described in conjunction with these specific embodiments, it will be understood that it is not intended to limit the present disclosure to the described embodiments. On the contrary, it is intended to cover alternatives, modifications, and equivalents as may be included within the spirit and scope of the present disclosure as defined by the appended claims.

In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure.

Various techniques and mechanisms of the present disclosure will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Still furthermore, it should be noted that like reference numerals are intended to identify the same structural elements, portions or surfaces consistently throughout the figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure normally faces the reader. Similarly, the terms "inwardly" and "outwardly" generally refer to the orientation of a surface relative to its axis of elongation, or axis of rotation, as appropriate.

Overview

The present disclosure provides a low profile electro-hydrostatic actuator that self-contains a hydraulic actuator, a reservoir, an electric motor, and a hydraulic pump driven by the electric motor for moving hydraulic fluid from the reservoir to the hydraulic actuator for actuating the actuator.

In some embodiments, the electro-hydrostatic actuator is adapted with a bi-directional pump system to eliminate the stopping and direction reversing of the electric motor. In some embodiments, the electro-hydrostatic actuator is further adapted with a thermal management layer to maintain operating temperature.

EXAMPLE EMBODIMENTS

Figure 1:
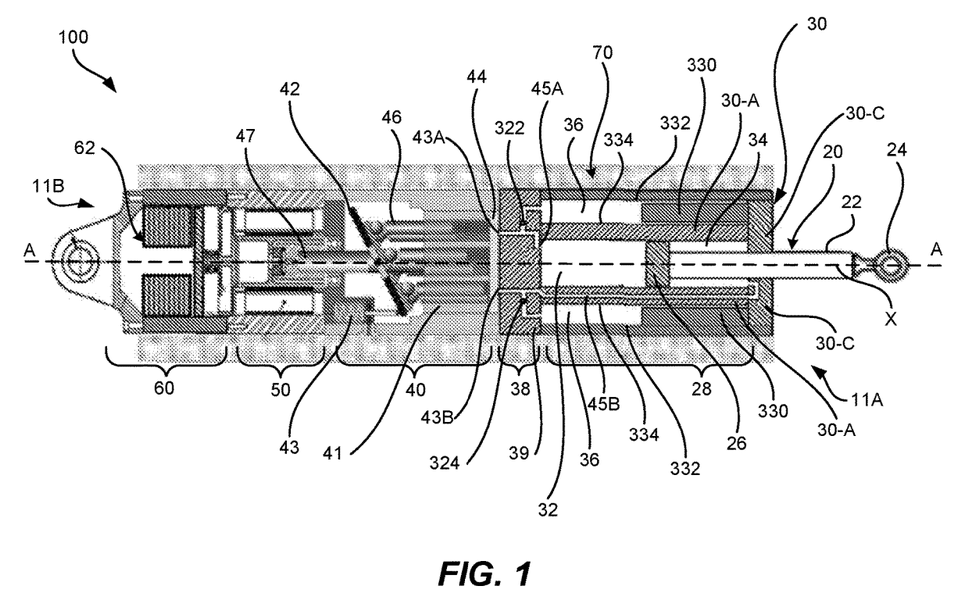
FIG. 1 illustrates a cross section view of an example electro-hydrostatic actuator, in accordance with one or more embodiments of the present disclosure.

FIG. 1 illustrates a cross section view of an example electro-hydrostatic actuator in accordance with one or more embodiments of the present disclosure. An electro-hydrostatic actuator 100 is shown herein to include a hydraulic cylinder 30 having a piston assembly 20 moveably located within a hydraulic fluid chamber housing 30-A. The electro-hydrostatic actuator 100 is generally cylindrical in shape with a first end 11A and an opposite second end 11B along a center axis X at the A-A line. The piston assembly 20 is moveably arranged within a hydraulic fluid chamber region 28 of the hydraulic cylinder 30 on the end 11A. In various embodiments, hydraulic cylinder 30-A comprises a piston assembly 20 within hydraulic fluid chamber housing 30-A surrounding a hydraulic fluid chamber region 28. The piston assembly 20 comprises a piston head 26, a piston rod 22 extending from the piston head 26, and a rod end 24, with the rod end 24 operably extending or retracting relatively to the end 11A. The piston head 26 divides the hydraulic fluid chamber region 28 of the hydraulic cylinder 30 into a piston side chamber 32 and a rod side chamber 34. The volume or size of piston side chamber 32 and rod side chamber 34 will vary based on the position of extension or retraction of piston assembly 20.

The electro-hydrostatic actuator 100 further includes an integrated control module 60, an electric motor 50, a pumping system 40 having a valve plate 44, a reservoir 36 in fluid communication with a flow control network 38 and the hydraulic fluid chamber region 28. The reservoir 36 and the hydraulic fluid chamber 28 may both be sealed by an end cap 30-C. End cap 30-C may sealingly engages piston rod 22 allowing movement of the piston rod 22 along the X axis while preventing escape of fluid from the reservoir 36 or hydraulic fluid chamber 28. At the outer periphery, the electro-hydrostatic actuator 100 includes a thermal management layer 70 to dissipate operating heat generated and maintain operating temperature.

The electric motor 50 is located adjacent to and operatively coupled to the pumping system 40 for driving the pumping system 40 in opposite first and second rotational directions. The pump system 40 includes a first inlet and outlet port 43A, a second inlet and outlet port 43B, a pump drive shaft 47, and a swash plate 42 operating a plurality of pump pistons 46 for changing displacement of the pumping system 40. In some embodiments, swash plate 42 may be a fixed swash plate. In other embodiments, swash plates may be a variable angle swash plate.

A first fluid passage 45A connects the first inlet and outlet port 43A and the piston side chamber 32. A second fluid passage 45B connects the second inlet and outlet port 43B and the rod side chamber 34. In various embodiments, second fluid passage 45B is integrated within a portion of hydraulic fluid chamber housing 30-A, as shown. A third fluid passage (not shown) returns the hydraulic fluid leaked from the pumping system 40 to the reservoir 36 for accumulation.

The reservoir 36 is in fluid communication with the pump system 40, the flow control network 38, and the hydraulic fluid chamber region 28. As shown herein, the flow control network 38 is integrated in an integrated hydraulic cylinder boss 39, such as hydraulic cylinder boss 211, further described below with reference to FIG. 2. A membrane 330 is adapted inside the reservoir 36, between a surface 332 of an inner periphery of a reservoir wall and a surface 334 of an outer periphery of the hydraulic fluid chamber housing. The membrane 330 provides the reservoir 36 with boosted fluid pressure storage.

The hydraulic fluid reservoir 36 is connected via a first control valve 322 to the first fluid passage 45A, and via a second control valve 324 to the second fluid passage 45B. As the pump system 40 supplies hydraulic fluid to the piston side chamber 32, the first control valve 322 closes the fluid passage into the reservoir 36. On the other hand, as the piston rod 22 extends to discharge the hydraulic fluid from the rod side chamber 34, the second control valve 324 opens the fluid passage to the reservoir 36. Conversely, when the pump system 40 supplies hydraulic fluid to the rod side chamber 34 and discharges fluid from the piston side chamber 32, the control valve 322 opens into the reservoir 36 while the control valve 324 closes the passage into the reservoir 36.

The piston assembly 20 is operable for extending or retracting the piston rod 22 relative to the hydraulic cylinder 30 at the first end 11A. The rod end 24 is typically in connection with an external load (not shown) to actuate the movement of the external load upon the movement of the piston rod 22.

As used herein, pump system 40 may be referred to as a rotating group. In various embodiments, a rotating group may comprise one or more of the following: a hydraulic pump cylinder block 41, one or more pump pistons 46, swash plate 42, and valve plate 44. The multiple pump pistons 46 may be coupled to swash plate 42 which is configured at an angle about the X axis. As previously described, swash plate 42 may be a fixed swash plate and set at a fixed angle. Alternatively, swash plate 42 may be variable angle swash plate and the configuration of the angle may be determined by a motorized adjuster 43, which may extend or retract based on a desired amount.

Each pump piston 46 is situated within a chamber of the hydraulic pump cylinder block 41. Hydraulic pump cylinder block 41 may be hydraulic pump cylinder block 214 described below. Electric motor 50 may be mechanically coupled to one or more components of the rotating group via pump drive shaft 47. As electric motor 50 is activated, it causes pump drive shaft 47 to rotate hydraulic pump cylinder block 41 and swash plate 42 with pump pistons 46 causing the each pump piston 46 to reciprocate in their respective chambers within hydraulic pump cylinder block 41. This drives the hydraulic pump system and causes fluid to be flowed into and out of the hydraulic cylinder 30.

In some embodiments, the direction of hydraulic flow is determined by a direction of movement of the electric motor. In some embodiments, the direction of the hydraulic flow is determined by a direction of movement of the fixed or variable angle swash plate. For example, the piston rod 22 may extend along the center axis X and towards the first end 11A when the electric motor 50 is operated to drive the pump system 40 in a first direction causing the hydraulic fluid, e.g., oil or the like, supplied into the piston side chamber 32 and discharged from the rod side chamber 34. Conversely, the piston rod 22 may retract along the center axis X and towards the second end 11B, when the electric motor 50 is operated to drive the pump system 40 in a second direction causing the hydraulic fluid supplied into the rod side chamber 34 and discharged from the piston side chamber 32.

Various sealing components and mechanisms may be used for closing the opening of the hydraulic fluid chamber region 28 located on the first end 11A, as well as sealing about the piston rod 22 protruding on the first end 11A. Various known sealing mechanisms for sealing the circumference of the piston head 26 may also be used to prevent hydraulic fluid flow between the piston side chamber 32 and the rod side chamber 34.

In some other embodiment, the electric motor 50 is an electric servo motor, and the pump system 40 is a bi-directional, positive displacement hydraulic pump. Control of actuator position, rate, and output force is provided by at least one of modulating motor/pump speed and changing direction of the motor/pump rotation. where the pump system 40 is a bi-directional pump and has a first and second inlet and outlet ports 43A and 43B respectively connected to the first fluid passage 45A and the second fluid passage 45B. The pump system 40 is operable in one direction for supplying pressurized fluid from the first inlet and outlet port 43A to the piston side chamber 32 of the hydraulic fluid chamber region 28 while drawing fluid through the second fluid passage 45B from the rod side chamber 34 of the hydraulic fluid chamber region 28 for extending the piston rod 22 in a first direction. The pumping system 40 is also operable in a second direction opposite the first direction for supplying pressurized fluid from a second inlet and outlet port 43B through the second fluid passage 45B to the rod side chamber 34 of the hydraulic fluid chamber region 28, while drawing fluid through the first fluid passage 45A from the piston side chamber 32 of the hydraulic fluid chamber region 28 for retracting the piston rod 22 in a second direction that is opposite the first direction.

Where pump system 40 is a bi-directional pump, pump system 40 can be any one of various types of pumps suitable to move hydraulic fluid in opposite directions through the ports to and from the piston side chamber 32 and the rod side chamber 34. When a hydraulic servo pump such as swash plate piston pump is used, hydraulic power is provided by the combination of a unidirectional constant speed electric motor and the hydraulic servo pump. For example, a servo-pump can include a fixed swash plate or a variable angle swash plate for the control of flow magnitude and direction, with the direction of the flow being determined by direction of movement of the swash plate and the magnitude of the flow being controlled by the angle through which the swash plate is tilted. Thus, the reversal of the piston stroke can be accomplished without stopping and reversing direction of the motor/pump.

The flow of fluid from the pumping system 40 through the hydraulic cylinder boss 39 and into the hydraulic cylinder 30 may be managed by valve plate 44. In various embodiments, valve plate 44 may have a series of kidney shaped passageways that are aligned with the chambers within pump cylinder block 41. The structure and operation of valve plate 44 is further discussed below. In embodiments where the pump system 40 comprises a bi-directional pump, the valve plate 44 may be anchored and secured in a fixed position to the walls of the electro-hydrostatic apparatus 100. In some embodiments, valve plate 44 may be anchored to hydraulic cylinder boss 39 in a fixed position.

However, a bi-directional pump system 40 may incur additional load on the rotating group and reversing rotation motions may add additional wear on the pump system 40 components, such as motor 50 and other bearings. Thus, in some embodiments, a unidirectional motor may be implemented for motor 50. In such embodiments, motor 50 rotates pump drive shaft 47 and the rotating group in only one direction. This may be either clockwise or counterclockwise. Thus, to successfully control the movement of fluid into and out of hydraulic fluid chamber 28 and reservoir 36, valve plate 44 may be configured to rotate relative to hydraulic cylinder boss 39 and the rotating group. In various embodiments, valve plate 44 may be rotated either clockwise or counterclockwise in order to align its passageways with particular chambers within pump cylinder block 41 such that fluid may be pumped into and out of the appropriate passageways of the flow control network 38.

The integrated control module 60, disposed at the second end 11B opposite to the piston assembly, is adjacent to and operatively coupled to the pumping system 40. In some embodiments, integrated control module 60 may be a power electronic control module. The integrated control module 60 outputs control commands for components such as the pumping system 40, the motorized adjuster 43, the electric motor 50, and the valve plate 44. The integrated control module 60 also supplies driving electric power to the electric motor 50. Control commands are generated according to various signals input to the integrated control module 60. Such signals can be control signals from external controller such as a vehicle management computer (VMC), or signals of motor speed, swash plate angle, output force of the piston assembly 20, or the like. For example, a position sensor 62 detects a position of the piston rod 22 and inputs the sensed position information as a signal to the integrated control module 60. In some embodiments, the integrated control module 60 converts the control signal into a set-point value at which the electric motor 50 is commanded to drive the pumping system 40. As depicted in FIG. 1, position sensor 62 may be one of multiple elements comprising the integrated control module 60. However, in some embodiments, positions sensor 62 may be an integral part of hydraulic the cylinder boss, piston rod 22, or piston assembly 20.

As shown herein, the thermal management layer 70 layer is formed to enclose the outer periphery of the electro-hydrostatic actuator 100. In some embodiments, the thermal management layer 70 is disposed about the outer periphery of the electro-hydrostatic actuator 100 at selective areas known for needs of heat dissipating, depending on the particular inline configuration of the components of the electro-hydrostatic actuator 100. For example, such heat sensitive areas can be the surfaces corresponding to the portions of the hydraulic cylinder 30 where at least one of the electric motor and the pump system are arranged. Such thermal management layer 70 can be made of any suitable materials exhibiting high thermal conductivity. For example, thermal layer materials include, but are not limited to, metals, carbon, graphite, epoxy fibers, ceramics, metal-matrix composites, carbon-matrix composites (e.g., Carbon-Nickel nanoparticles grown on carbon fibers), ceramic-matrix composites, or the like. In some embodiments, the thermal management layer 70 is treated with metallic lining to prevent fluid permeation. In various embodiments, hydraulic cylinder 30 can be made of any suitable materials such as carbon fiber composites, high performance light-weight alloys.

Figure 2:
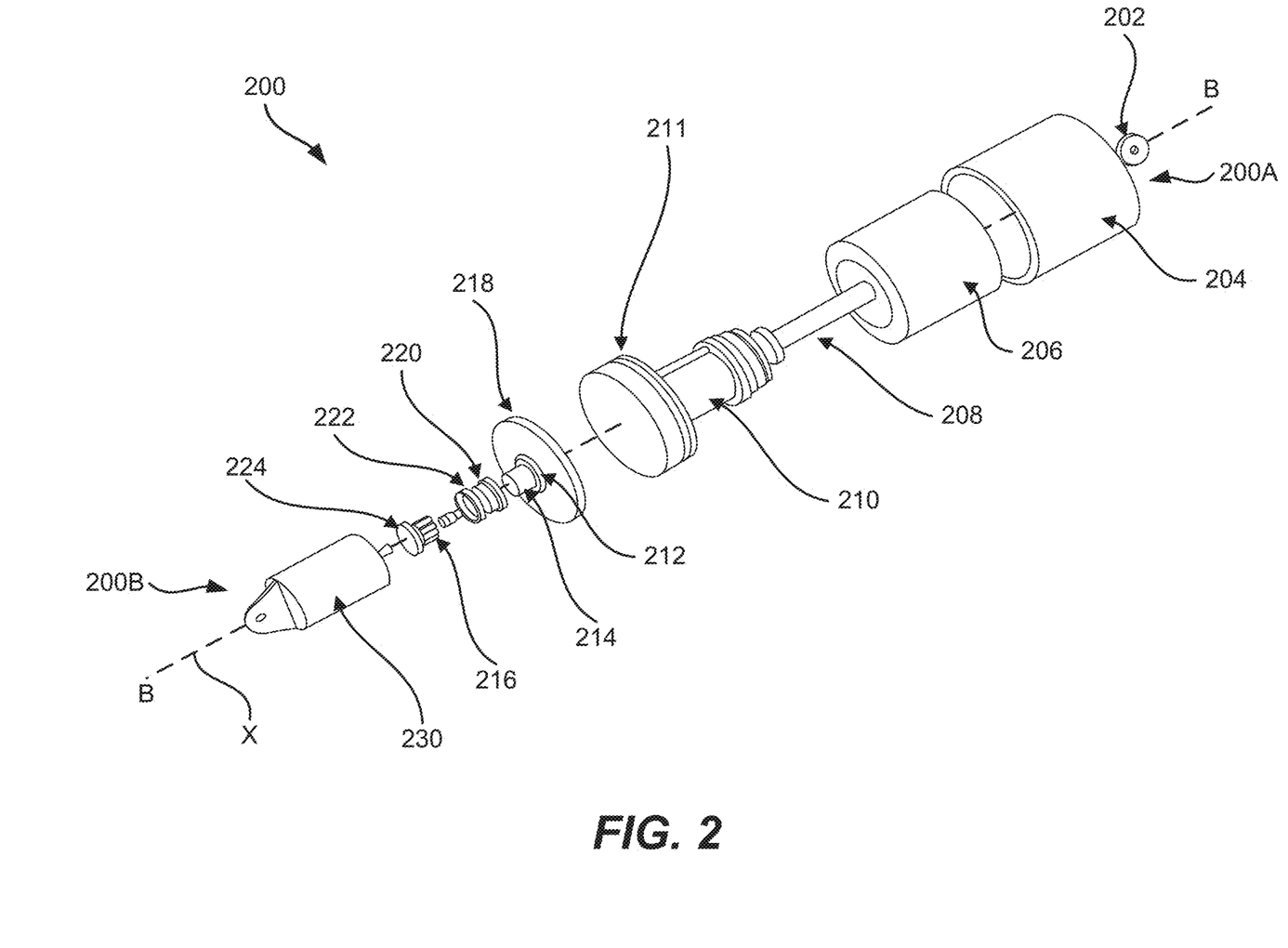
FIG. 2 illustrates an exploded perspective view of an example electro-hydrostatic actuator, in accordance with one or more embodiments of the present disclosure.

FIG. 2 illustrates an exploded perspective view of an example electro-hydrostatic actuator in accordance with one or more embodiments of the present disclosure. The electro-hydrostatic actuator 200 has various components arranged in an inline configuration along and about a central axis X at the line B-B. In various embodiments, electro-hydrostatic actuator 200 may be electro-hydrostatic actuator 100. The electro-hydrostatic actuator 200 comprises an integrated hydraulic cylinder 210. In some embodiments the integrated hydraulic cylinder 210 may be hydraulic cylinder 30, and includes a piston assembly 208 moveably mounted inside a piston assembly housing of an integrated hydraulic cylinder 210, with the piston rod end 202 extending to and retracting from a first end 200A. The integrated hydraulic cylinder 210 may be housed and surrounded inside a reservoir enclosure 204 (or shell) having a bellow assembly enclosure (206) (or shell) configured thereinside, as more details being illustrated with reference to FIG. 3.

The integrated hydraulic cylinder 210 may be coupled to hydraulic cylinder boss 211. In some embodiments hydraulic cylinder boss 211 may be hydraulic cylinder boss 39, and may include a flow control network (not shown), such as flow control network 38. In various embodiments, an electro-hydrostatic actuator may be configured to house single, dual, triplex, or quad pumping systems depending on redundancy requirements. The flow control network (such as 38 or 420) within a hydraulic cylinder boss 211 may be configured to accommodate the particular flow configuration. Hydraulic cylinder boss 211 may connect to a valve plate 212 with an optional adapter plate 218 disposed therebetween. In some embodiments, valve plate 212 may be integrated into the hydraulic cylinder boss 211 or machined as a separate part for assembly. The electro-hydrostatic actuator 200 further includes a rotating group comprising pump cylinder block 214 housing a plurality of pump pistons 216 coupled to a swash plate 224, a pump bearing 222, and a bearing race 220. At a second end 200B, the electro-hydrostatic actuator 200 includes an electric motor and control modules 230 (not shown separately). The control module at 230 may be integrated control module 60. The electric motor may be electric motor 50.

As shown herein, with the inline configuration of various components in the direction along and about the center axis X, the electro-hydrostatic actuator 200 allows its center of gravity to be positioned on or near the center axis X to achieve better weight balancing. Furthermore, with the cylinder block 214 of the pump system also arranged about the center axis X, such a configuration also provides a rotation balance in driving of the pump. Both contribute to improved satisfaction of various vibration requirements for the electro-hydrostatic actuator 200.

Figure 3:
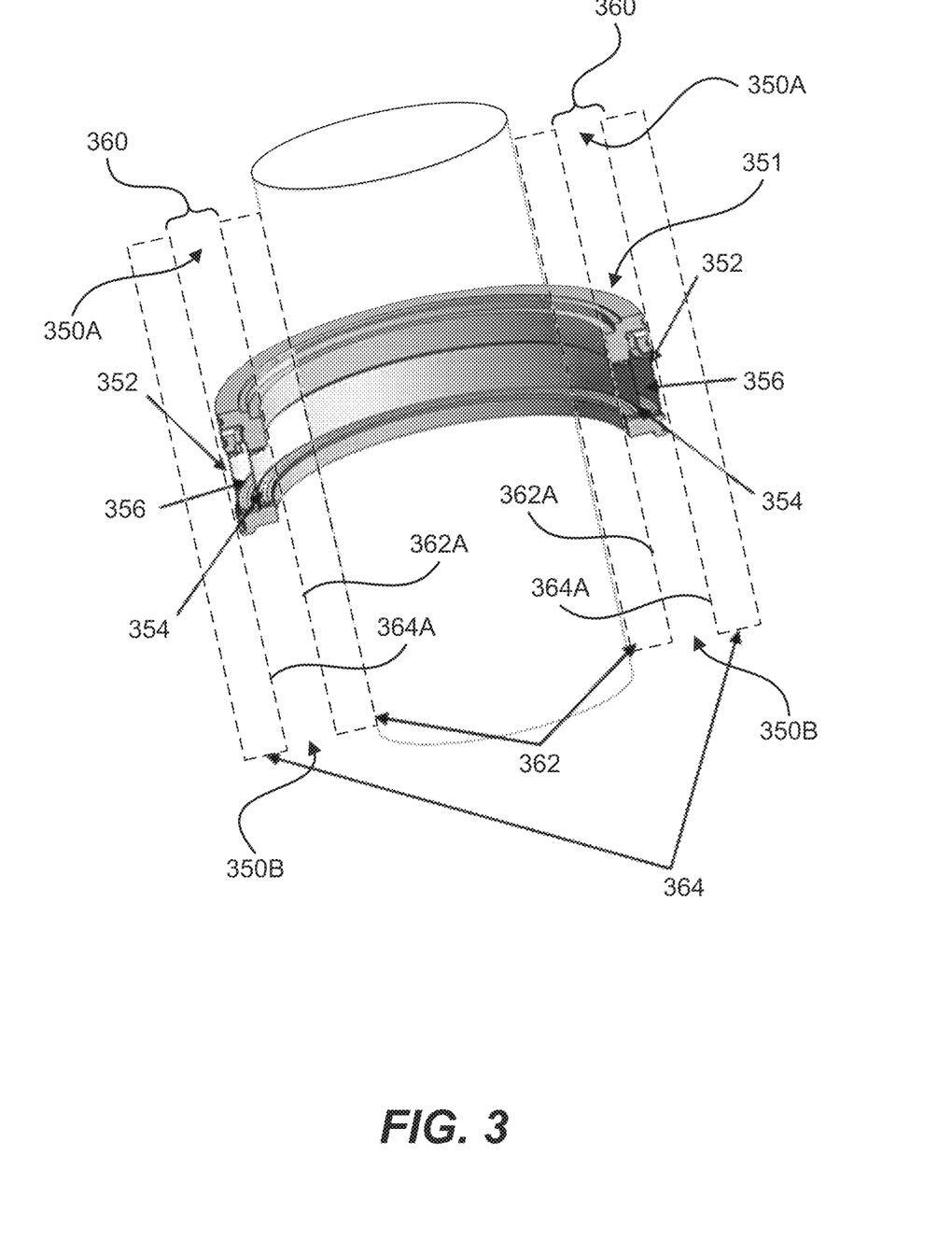
FIG. 3 illustrates a fragmentary schematic view of a bellow assembly arranged within a reservoir of an example electro-hydrostatic actuator, in accordance with one or more embodiments of the present disclosure.

FIG. 3 illustrates a fragmentary schematic view of a bellow assembly 351 arranged within a reservoir 360 of an example electro-hydrostatic actuator, in accordance with one or more embodiments of the present disclosure. In some embodiments, reservoir 360 may be reservoir 36 previously described with reference to FIG. 1. As shown herein, a reservoir 360 is formed between an inner surface 364A of a reservoir wall 364 (such as that of reservoir enclosure 204) and an outer surface 362A of an outer periphery 362A of a hydraulic piston assembly housing 362. In some embodiments inner surface 364A corresponds to surface 332 described in FIG. 1. In some embodiments outer surface 362A corresponds to surface 334 described in FIG. 1.

The reservoir 360 has its interior subdivided into two pressure compartments 350A and 350B by a bellow assembly 351 that is alternately known as a separating member 351. In some embodiments, the separating member 351 is a metallic or non-metallic membrane, such as membrane 330 described in FIG. 1. In some other embodiments and as shown herein, the separating member 351 is a thin-walled metallic or non-metallic bellow, including an outer bellow 352 and an inner bellow 354. The outer bellow 352 is fitted to surround and abut the inner surface 364A of the reservoir wall 364, while the inner bellow 354 is fitted to surround and abut the outer surface 362A of the piston assembly housing 362. In some embodiments, as the bellow assembly 351 contracts or expands, it is adapted to slide along the outer periphery 362A of the piston assembly housing wall 362, and along an inner periphery 364A of the reservoir wall 364.

The compartment 350A is located towards the piston rod end (not shown herein), and the compartment 350B is located towards the piston end (not shown herein) and in fluid communication with a hydraulic fluid chamber region and a flow control network. In some embodiments, compartment 350A is filled with a gas typically under high pressure to provide pressure storage.

In some embodiments, the interior of the bellow assembly 351 is a pressure storage chamber 356 which can be filled with a gas under high pressure and is not in fluid communication with either one of the two pressure compartments 350A and 350B. Such gas can be nitrogen gas or any other inert gas. The bellow assembly 351 can take any suitable form such as pleated bellow, metallic membrane, non-metallic membrane, or the like.

Figure 4:
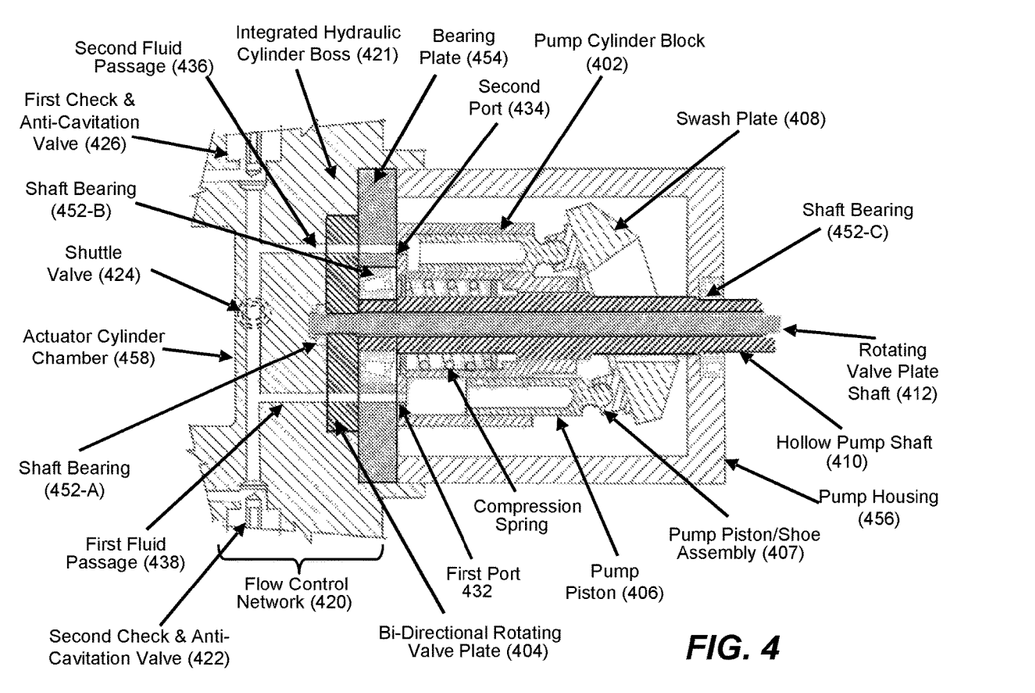
FIG. 4 illustrates a fragmentary cross section view of a pumping system disposed adjacent to a moveable valve plate and in fluid communication with a flow control network of an example electro-hydrostatic actuator, in accordance with one or more embodiments of the present disclosure.

FIG. 4 illustrates a fragmentary cross section view of a pumping system disposed adjacent to a moveable valve plate and in fluid communication with a flow control network of an example electro-hydrostatic actuator in accordance with one or more embodiments of the present disclosure. In various embodiments, pumping system may be pumping system 40, previously described with reference to FIG. 1. As shown herein, the pumping system may be a variable displacement swash plate piston pump, comprising a swash plate 408 and a plurality of pump pistons 406 housed inside a pump cylinder block 402. In some embodiments, swash plate 408, pump pistons 406, and pump cylinder block 402 comprise a rotating group and are contained within a pump housing 456. In various embodiments, swash plate 408 may be a fixed or variable angle swash plate 408. The plurality of pump pistons 406 are mounted to the swash plate 408 at their respective piston shoe assemblies 407 for axial sliding in their respective pump cylinder.

A valve plate 404 is disposed interfacing the pump cylinder block 402 and a flow control network 420 to provide fluid communication between the swash plate pump and an integrated hydraulic cylinder boss 421 (partially shown). In various embodiments, valve plate 404 defines a fluid inlet and a fluid outlet (further described in FIG. 5) which are connected through passages in a backplate of the pump housing 456 or pump cylinder block 402 to the pump inlet port 432 and the pump outlet port 434, respectively. In some embodiments, valve plate 404 may be anchored to the backplate or the pump housing 456. In some embodiments, the backplate may be an integral part of pump housing 456. However, in some embodiments, valve 404 is anchored to or configured as an integral part of the integrated hydraulic cylinder boss 421. In some embodiments, valve plate 404 is anchored in a fixed position and does not move. In some embodiments, valve plate 404 may be a moveable valve plate which may rotate to align one or more inlet and outlet ports with any combination of passages in a black plate and ports 432 and 434 of the pump cylinder block 402.

As partially shown herein, a pump shaft 410, extending axially along the center axis X at the C-C line through the pump cylinder block 402, is mounted in suitable bearings 452-A in the moveable valve plate 404 and its base (not shown) for rotation by an electric motor (not shown). The pump shaft 410 may further be mounted in suitable bearings 452-C in the pump housing 456. The pump cylinder block 402 is adapted to rotate with the pump shaft 410 and in sliding engagement against the valve plate 404. In some embodiments, the hydraulic pump cylinder block 402 may be rotatably coupled to valve plate 404 via shaft bearings 452-B situated within a bearing plate 454, which may facilitate the sliding engagement against valve plate 404. In some embodiments, bearing plate 454 may be an integral part of pump cylinder block 402. In some embodiments, bearing plate 454 may be an integral part of valve plate 404. With the pump pistons 406 arranged annularly around and parallel to the pump shaft 410, when the pump shaft 410 and the pump cylinder block 402 are rotated, the pump pistons 406 are caused to axially reciprocate through a stroke determined by the angular position of the swash plate 408.

The swash plate 408 is mounted for tilting movement between a zero displacement position in which the swash plate is normal to the pump pistons 406, and either a forward or a reverse full displacement position in which the swash plate 408 is controlled to tilt in either direction from the center axis (e.g., the center axis X) of the pump cylinder block 402. As such, the swash plate 408 is a variable angle swash plate since the swash plate 408 may be tilted in different angles at various locations. In various embodiments, swash plate 408 does not rotate along with the other components of the rotating group. However, the piston shoe assembly 407 may be rotated with the pump cylinder block 402 and pump pistons 406 of rotating group on a well lubricated surface of the swash plate 408.

The pump may include a bi-directional or unidirectional configuration. A bi-directional pump may be a bi-directional positive displacement pump, which may cause rotating group to rotate in both a first direction and a reverse second direction to alternate the source of high pressure and low pressure hydraulic fluid. A fixed valve plate may be implemented in a bi-directional pump configuration. For example, in a bi-directional pump configuration, valve plate 404 may be anchored in a fixed position to the hydraulic cylinder boss 421 and the changing direction of the rotation of the rotating group causes variation of hydraulic pressures at appropriate outlet/inlet ports in valve 404. In a unidirectional pump configuration, the rotating group rotates in only one direction, which causes high pressure and low pressure hydraulic fluid to be located in one relative portion of the rotating group. A moveable valve plate may be implemented with a unidirectional pump configuration. For example, a moveable valve plate 404 may be rotatably situated within hydraulic cylinder boss 421 and moveable valve 404 may be rotated to control hydraulic pressure flow.

As previously described, in some embodiments, swash plate 408 may be a fixed or variable angle swash plate. In a fixed displacement pump where swash plate 408 is a fixed swash plate, the angle of tilt and direction of tilt are not varied and the hydraulic pressure in each pump chamber is the same at a particular position in the rotation of the rotating group. In a variable displacement pump where swash plate 408 is a variable angle swash plate, the angle of tilt and direction of tilt of swash plate 408 may be controlled based on flow demand of the hydraulic fluid. Implementation of a fixed swash plate and a variable angle swash plate are discussed further with reference to FIG. 5. As part of the swash plate pump control, an integrated control module, such as control module 60, is located within the hydraulic cylinder for receiving a control electric signal which controls the direction of movement of the swash plate and the angle of tilt of the swash plate. In various embodiments, the direction of movement of the swash plate determines the direction of hydraulic fluid flow. Further, the flow magnitude of the hydraulic fluid into the hydraulic fluid chamber region 458 is controlled by an angle by which the swash plate is tilted.

The valve plate 404, disposed between the pump cylinder block 402 and the flow control network 420 of hydraulic cylinder boss 421, may be anchored to hydraulic cylinder boss 421 in a fixed position. In other embodiments, valve plate 404 may be a bi-directional rotating valve plate. Valve plate 404 includes a first port 432 and a second port 434. In some embodiments, in association with the rotation of the cylinder block 402 about the center axis X by the pump shaft 410, each of the plurality of pump pistons 406 revolves around the center axis X and reciprocates in the direction along the center axis X. In association with the revolution and reciprocation of the plurality of pump pistons 406, hydraulic fluid is discharged or returned through the first port 432 or the second port 434.

In particular, when the swash plate 408 is tilted in a first direction, as depicted in FIG. 4, the first port 432 serves as a low pressure inlet, and the second port 434 as a high pressure outlet. In this operation, low pressure hydraulic fluid is suctioned through a first fluid passage 438 through the first port 432 of the valve plate 404 to return to the pump cylinder block 402. High pressure fluid from the pump cylinder block 402 is discharged through the second port 434 and into second fluid passage 436 of the flow control network 420 to be supplied to the hydraulic fluid chambers of the actuator (not shown).

Conversely, when the swash plate 408 is tilted in a reverse second direction, the second port 434 serves as a low pressure inlet, and the first port 432 as a high pressure outlet. In this operation, low pressure hydraulic fluid is suctioned through a second fluid passage 436 through the second port 434 of the valve plate 404 to return to the pump cylinder block 402. High pressure fluid from the pump cylinder block 402 is discharged through the first port 432 and through a first fluid passage 438 of the flow control network 420 to be supplied to the hydraulic fluid chambers of the actuator (not shown).

As shown herein, a first check and anti-cavitation valve 426, a second check and anti-cavitation valve 422, and a shuttle valve 424 are disposed in the flow control network 420, details of which are described below with respect to FIG. 5.

Further, as shown herein, a valve plate shaft 412 is configured to extend axially through a bore of the pump shaft 410 and mechanically coupled to the center of the valve plate 404. In association with the rotation of the valve plate shaft 412, the valve plate 404 is operable bi-directionally. In particular, when the valve plate shaft 412 rotates in a first direction, the valve plate 404 is caused to rotate in the first direction to change the opening and closing of the first port 432 and the second port 434. Conversely, when the valve plate shaft 412 rotates in an opposite second direction, the valve plate 404 is caused to rotate in the second direction to change the opening and closing of the first port 432 and the second port 434.

In some embodiments, the valve plate 404 is driven by a valve driving motor. In some other embodiments, the valve plate 404 is driven by a piezomotor, which is disposed in the integrated hydraulic cylinder boss as a precision mechanism to drive the valve plate 404. In some embodiments, the valve plate 404 is machined as a separate piece and mechanically attached to the hydraulic cylinder boss. In some other embodiments, the valve plate is machined as an integral part of the hydraulic cylinder boss.

In further detail, the valve plate 404 is configured with multiple semi-circular ports (kidneys) that control the inlet and outlet of fluid within the pump cylinder block 402. As the pump cylinder block 402 rotates about the center axis X, the exposed ends of the plurality of pump pistons 406 are constrained to follow the surface of a tilted plane attached to swash plate 408. Since the tilted plane is at an angle to the axis X of rotation, the plurality of pistons 406 reciprocate axially about the center axis X.

The axial motion of the pistons is sinusoidal causing the pistons 406 to operate in a reciprocating manner. During the rising portion of the pistons' reciprocation cycle, the pistons 406 moves toward the valve plate 404 and fluid trapped between the closed surface of the valve plate 404 and pistons 406 is vented to the pump's discharge port through one of the valve plate's semi-circular ports—the fluid is then pushed or displaced through the discharge port of the valve plate and pump housing.

As the reciprocation cycle continues, the connection between the trapped fluid chamber and the pump's discharge port is closed. Shortly thereafter, that same chamber becomes open to the pump's suction port. As the pistons 406 continues to precess about the cylinder block axis, they move away from the valve plate 404 thereby increasing the volume of the trapped chamber. As this occurs, fluid enters the chamber from the pump's suction port to fill the void. This process continues until the piston 406 reaches the bottom of the reciprocation cylinder block. The connection between the pumping chamber and suction port is closed. Shortly thereafter, the chamber becomes open to the discharge port again and the pumping cycle starts over.

Figure 5:
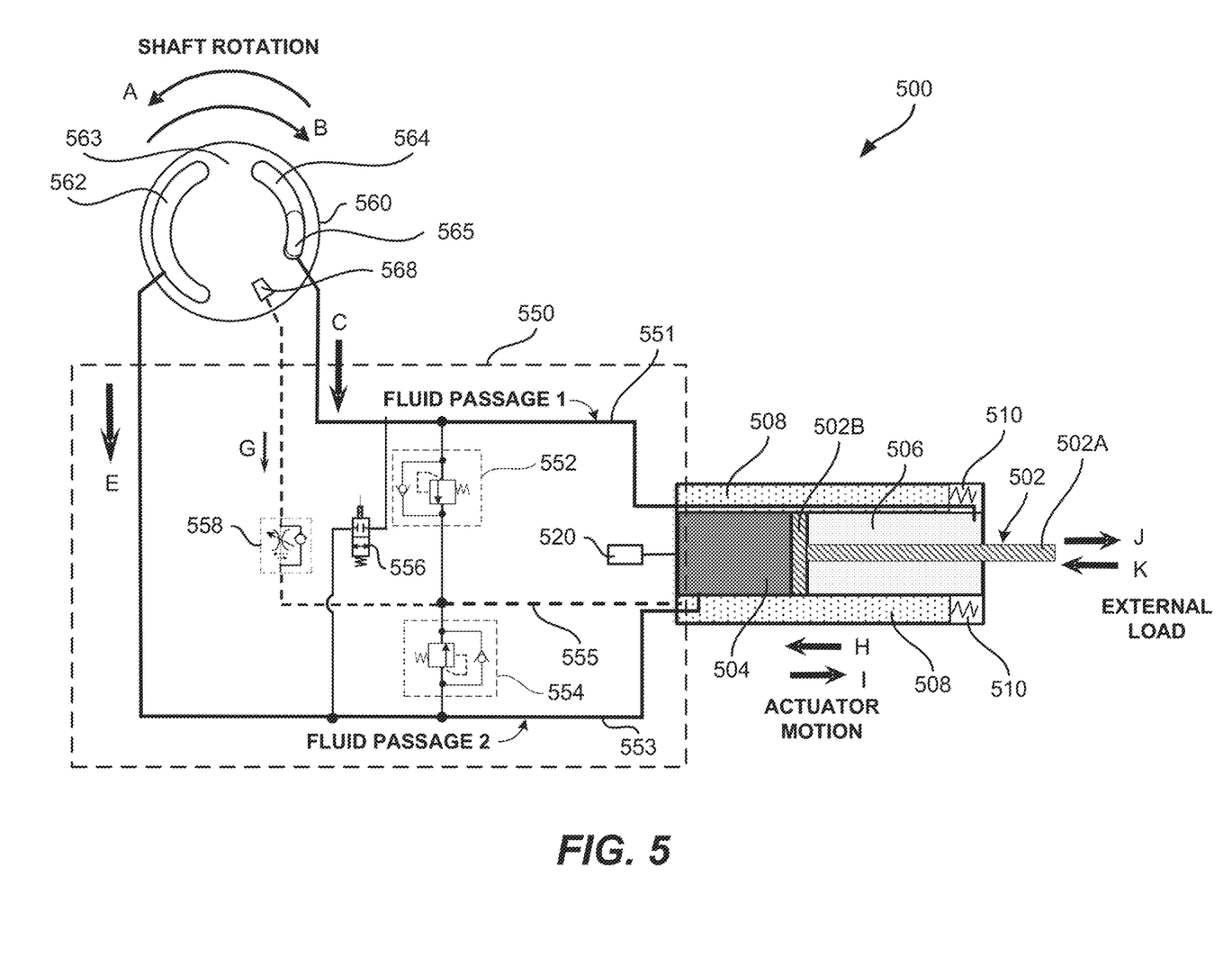
FIG. 5 illustrates a schematic view of various operation fluid paths of an example electro-hydrostatic actuator, in accordance with one or more embodiments of the present disclosure.

FIG. 5 illustrates a schematic view of various operation fluid paths of an example electro-hydrostatic actuator in accordance with one or more embodiments of the present disclosure. As shown herein, an external load (not shown) is operable to move in a direction along the J arrow line away from the electro-hydrostatic actuator 500, or in a direction along the K arrow line towards the electro-hydrostatic actuator 500. The piston assembly 502, having a piston head 502B and a piston rod end 502A, extends in a direction along the I arrow line, and retracts in a direction along the H arrow line. Thus, the hydraulic fluid movement traverses fluid passages in response to four (4) modes of actuator operation: retracting against loads; retracting with loads, extending against loads, and extending with loads.

In particular, valve plate 560 may be a fixed valve plate which is anchored in position. In order to retract the electro-hydrostatic actuator 500 by causing piston assembly 502 to move in the direction of the H arrow line, the pump (not shown herein) driven by a motor (not shown herein) rotates a rotating group, such as in pump system 40, in a direction along the A curved arrow line (clockwise in FIG. 5) to cause high pressure hydraulic fluid to be discharged from the second (outlet) port 564 of valve plate 560 through the first fluid passage 551 (along the direction of the C arrow line) and be supplied into a rod side chamber 506. At the same time, with the second fluid passage 553 under lower pressure, check & anti-cavitation valve 552 restricts the uncontrolled fluid flow in the first fluid passage 551 from leaking into the second fluid passage 553. Further, by use of the anti-cavitation valve 552, the risk of cavitation damage to the pump in connection with insufficient inlet pressure can be reduced. A check valve of the check & anti-cavitation valve 552 between the first fluid passage 551 and the second fluid passage 553 causes the hydraulic fluid to flow to the pump if the inlet pressure to the pump becomes too low during the operation.

Conversely, in order to extend the hydraulic actuator 500 by causing piston assembly 502 to move in the direction of the I arrow line, the pump (not shown herein) driven by a motor (not shown herein) rotates in a direction along the B curved arrow line (counter clockwise in FIG. 5) to cause high pressure hydraulic fluid to be discharged from the first (inlet) port 562 of the valve plate 560 through the second fluid passage 553 (along the direction of the E arrow line) and be supplied into a piston side chamber 504. At the same time, with the first fluid passage 551 under lower pressure, check & anti-cavitation valve 554 restricts the uncontrolled fluid flow in the second fluid passage 553 from leaking into the first fluid passage 551. Further, by use of the anti-cavitation valve 554, the risk of cavitation damage to the pump in connection with insufficient inlet pressure can be reduced. A check valve of the check & anti-cavitation valve 554 between the first fluid passage 551 and the second fluid passage 553 causes the hydraulic fluid to flow to the pump if the inlet pressure to the pump becomes too low during the operation.

As depicted piston slot 565 is aligned with the second port 564. Piston slot 565 may correspond to a piston chamber of the pump cylinder block at which high pressure hydraulic fluid is being generated by a pump piston. First port 562 and second port 564 may be additionally aligned with additional piston slots (not shown).

In some embodiments, the pump system includes a third (case drain) port 568 through valve plate 560 to cause at least one of the bypass and control hydraulic fluid to flow through a third fluid passage 555 (along the direction of the G arrow line) back to the fluid reservoir 508. Generally, increased volume in the fluid flow at the third port 568 may indicate at least one of a reduction in pump efficiency and worn pump parts. Further, the fact that the degree of hydraulic fluid viscosity and the clearance between moving parts varies under different temperatures also contributes to the increased volume in the fluid flow at the third port 568. In some embodiments, a pressure and temperature compensated flow control valve 558 is disposed in the third port 568 to give a warning when the third port 568 discharges a fluid flow of a volume exceeding a specified threshold.

In some embodiment, the fluid reservoir 508 includes a bellow 510 configured thereinside, between an inner periphery of the reservoir wall and an outer periphery of the piston assembly housing, to provide for boosted pressure storage.

As shown herein FIG. 5, a flow control network 550 includes the first fluid passage 551, the second fluid passage 553, the third fluid passage 555, the check valve of the check & anti-cavitation valve 552, the check valve of the check & anti-cavitation valve 554, the shuttle valve 556, and the pressure and temperature compensated flow control valve 558. In some embodiments, the flow control network may be implemented as the flow control network 38 or FIG. 1, or the flow control network 420 of FIG. 4.

In some embodiments, the electro-hydrostatic actuator 500 further comprises a position sensor 520 that monitors a position of the piston assembly 502, according to which at least one of a speed and a direction of the electric motor of the electro-hydrostatic actuator 500 is controlled according to the position of the piston assembly 502. In some embodiments, the piston position signals generated by the position sensor 520 is provided to the control module of the electro-hydrostatic actuator 500 for control of the at least one of the electric motor and the pumping system. In some embodiments, the position sensor is a linear variable differential transformer (LVDT).

In some embodiments, a shuttle valve 556 is used to reduce the fluid flow required to extend an unequal area actuator so that reduced actuation force may be permissible in one direction. When the retract line is pressurized the shuttle valve 556 shuttles across to isolate the retract line from the extend line. When the extend line is pressurized the shuttle valve 556 blocks the retract line allowing flow from the retract side of the piston to flow to the extend side.

As previously described, the pump system may be a unidirectional system in which rotating group may rotate in only one direction. A variable angle swash plate may be implemented in a unidirectional system and controlled to change hydraulic pressure at particular locations relative to valve plate 560. A unidirectional pump system with a fixed or variable angle swash plate may also be implemented with a moveable valve plate. In some embodiments, a moveable valve plate may also be implemented in a bi-directional pump system.

In some embodiments, valve plate 560 may be a moveable valve plate, and movement of valve plate 560 may be controlled by a valve shaft, such as valve shaft 412. In such embodiments, the pump (not shown herein) driven by a motor (not shown herein) may continuously rotate in a single direction along either the A or the B curved arrow line. Because the pump rotates in a singular direction, high pressure fluid may be generated at one side of the pump and low pressure fluid may be generated at another side of the pump based on the tilt of the swash plate (not shown). Thus swash plate 560 may rotate in either the A or the B curved arrow line in order to align either first port 562 or second outlet port 564 with fluid passageway 551 or 553 such that high pressured fluid may pass from piston chambers in a pump cylinder block through port 562 or 564 and into passageway 551 or 553. Swash plate 560 may additionally or alternatively be aligned such that low pressure fluid may pass from fluid passageway 551 or 553 through port 562 or 564 and into piston chambers in the pump cylinder block.

For example, based on the angle of tilt of a swash plate, such as swash plate 408, high pressure fluid may be generated by pump pistons of the pump cylinder block located at a point at the left side of valve plate 560. Valve plate 560 may be rotated in the direction of the A arrow line or B arrow line such that first port 562 is aligned with the pump pistons generating high pressure hydraulic fluid, allowing the high pressure hydraulic fluid to flow into second passageway 553 in the direction of the E arrow line. This may cause piston side chamber 504 to fill with fluid and cause actuator to extend in the direction of the I arrow line. As another example, valve plate 560 may be rotated such that a solid portion 563 may be aligned with the pump pistons generating high pressure hydraulic fluid, thereby blocking the high pressure fluid from entering into second passageway 553.

Examples of Aircraft and Methods of Fabricating and Operating Aircraft

Figure 6:
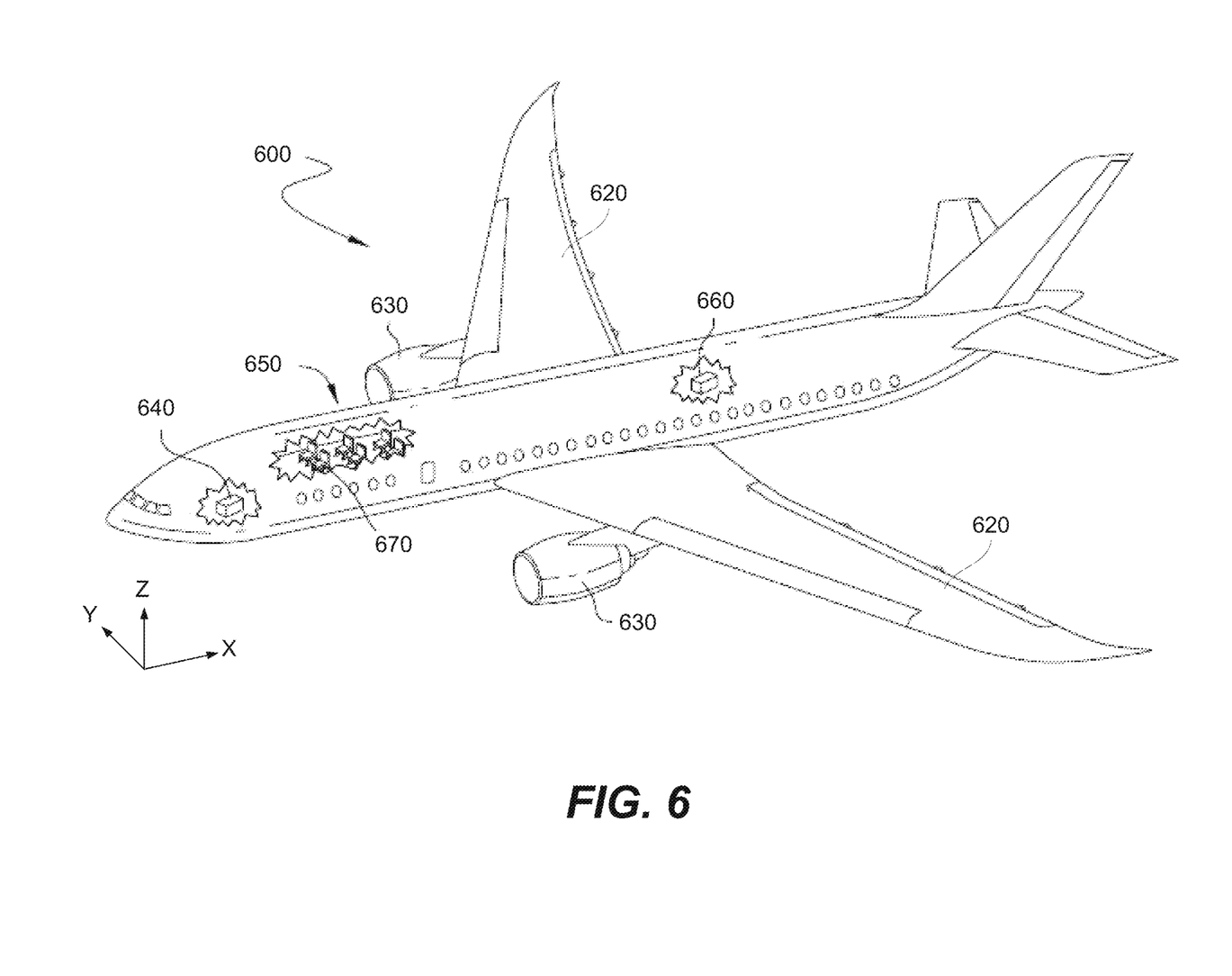
FIG. 6 is a schematic illustration of an aircraft, in accordance with one or more embodiments of the present disclosure.

To better understand various aspects of implementation of the described systems and techniques, a brief description of an aircraft and aircraft wing is now presented. FIG. 6 is a schematic illustration of aircraft 600, in accordance with some embodiments. As depicted in FIG. 6, aircraft 600 is defined by a longitudinal axis (X-axis), a lateral axis (Y-axis), and a vertical axis (Z-axis). In various embodiments, aircraft 600 comprises airframe 650 with interior 670. Aircraft 600 includes wings 620 coupled to airframe 650. Aircraft 600 may also include engines 630 supported by wings 620. In some embodiments, aircraft 600 further includes a number of high-level inspection systems such as electrical inspection system 640 and environmental inspection system 660. In other embodiments, any number of other inspection systems may be included.

Aircraft 600 shown in FIG. 6 is one example of a vehicle of which components may be fabricated, modified, or machined to include at least one of actuators 100 and 200, in accordance with illustrative embodiments. Although an aerospace example is shown, the principles disclosed herein may be applied to other industries, such as the automotive industry. Accordingly, in addition to aircraft 600, the principles disclosed herein may apply to other vehicles, e.g., land vehicles, marine vehicles, space vehicles, etc.

Figure 7:
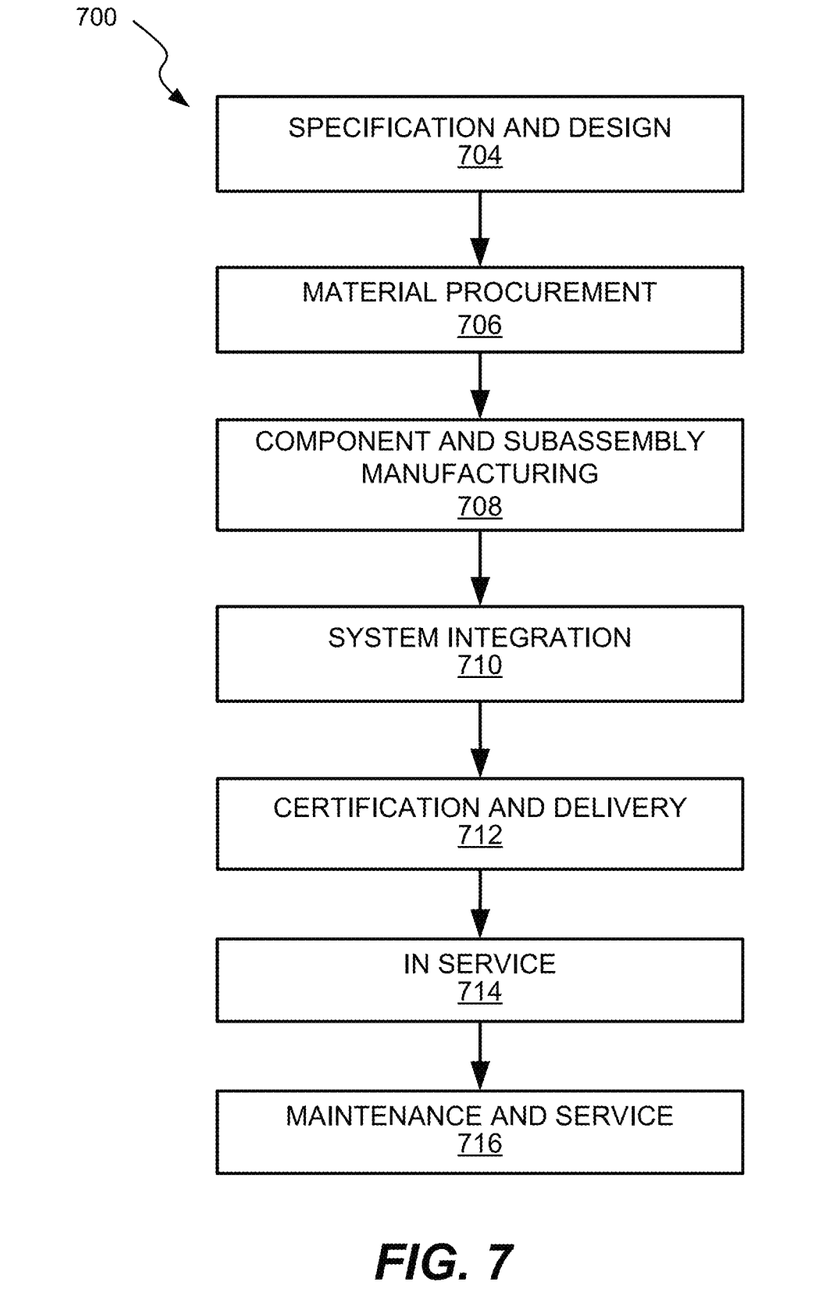
FIG. 7 is a block diagram of aircraft production and service methodology that may utilize methods and assemblies described herein.

Examples of the present disclosure may be described in the context of aircraft manufacturing and service method 700 as shown in FIG. 7 and aircraft 600 as shown in FIG. 6. During pre-production, illustrative method 700 may include specification and design (block 704) of aircraft 600 and material procurement (block 706). During production, component and subassembly manufacturing (block 708) and inspection system integration (block 710) of aircraft 600 may take place. Described devices and assemblies, and corresponding methods, can be used in any of specification and design (block 704) of at least one of aircraft 600, material procurement (block 706), component and subassembly manufacturing (block 708), and inspection system integration (block 710) of aircraft 600.

Thereafter, aircraft 600 may go through certification and delivery (block 712) to be placed in service (block 714). While in service, aircraft 600 may be scheduled for routine maintenance and service (block 716). Routine maintenance and service may include modification, reconfiguration, refurbishment, etc. of one or more inspection systems of aircraft 600. Described devices and assemblies, and corresponding methods, can be used in any of certification and delivery (block 712), service (block 714), and routine maintenance and service (block 716).

Each of the processes of illustrative method 700 may be performed or carried out by an inspection system integrator, a third party, or an operator (e.g., a customer). For the purposes of this description, an inspection system integrator may include, without limitation, any number of aircraft manufacturers and major-inspection system subcontractors; a third party may include, without limitation, any number of vendors, subcontractors, and suppliers; and an operator may be an airline, leasing company, military entity, service organization, and so on.

Apparatus(es) and corresponding method(s) shown or described herein may be employed during any one or more of the stages of manufacturing and service method (illustrative method 700). For example, components or subassemblies corresponding to component and subassembly manufacturing (block 708) may be fabricated or manufactured in a manner similar to components or subassemblies produced while aircraft 600 is in service (block 714). Also, one or more examples of the apparatus(es), method(s), or combination thereof may be utilized during production stages (block 708) and (block 710), for example, by substantially expediting assembly of or reducing the cost of aircraft 600. Similarly, one or more examples of the apparatus or method realizations, or a combination thereof, may be utilized, for example and without limitation, while aircraft 600 is at least one of in service (block 714) and during maintenance and service (block 716).

While the present disclosure has been particularly shown and described with reference to specific embodiments thereof, it will be understood by those skilled in the art that changes in the form and details of the disclosed embodiments may be made without departing from the spirit or scope of the present disclosure. It is therefore intended that the present disclosure be interpreted to include all variations and equivalents that fall within the true spirit and scope of the present disclosure. Although many of the components and processes are described above in the singular for convenience, it will be appreciated by one of skill in the art that multiple components and repeated processes can also be used to practice the techniques of the present disclosure.

What is claimed is:

1. An electro-hydrostatic actuator comprising:
   a piston assembly having a piston head and a piston rod extending from the piston head;
   a hydraulic cylinder, wherein the piston assembly is located and movable within the hydraulic cylinder, the hydraulic cylinder including a hydraulic fluid chamber region including a piston side chamber and a rod side chamber;
   a reservoir for storing hydraulic fluid located within the electro-hydrostatic actuator which is in fluid communication with the hydraulic fluid chamber region, wherein the reservoir is configured to surround an outer periphery of the hydraulic fluid chamber region and is subdivided into a first and a second pressure chambers by a bellow assembly, wherein the first pressure chamber includes a first gas pressure chamber, wherein the second pressure chamber includes a fluid pressure chamber, wherein the bellow assembly includes a third pressure chamber different from the first and second pressure chambers, wherein the third pressure chamber includes a second gas pressure chamber separate from the first gas pressure chamber;
   a hydraulic pump system for moving hydraulic fluid in the reservoir and the hydraulic fluid chamber region, the hydraulic pump system in fluid communication with a flow control network in a hydraulic cylinder body for controlling a direction and flow magnitude of hydraulic fluid within the hydraulic fluid chamber region, wherein the flow control network includes a first fluid passage and a second fluid passage separated by a check valve and an anti-cavitation valve, the check valve and anti-cavitation valve configured to restrict uncontrolled fluid flow between the first fluid passage and the second fluid passage, wherein the anti-cavitation valve is further configured to reduce cavitation damage to the hydraulic pump system; and
   an electric motor located within the electro-hydrostatic actuator for driving the hydraulic pump system.

2. The electro-hydrostatic actuator of claim 1, further comprising an integrated control module located within the electro-hydrostatic actuator for receiving a control signal and converting the control signal into a set-point value at which the electric motor drives the hydraulic pump system.

3. The electro-hydrostatic actuator of claim 1, wherein the electric motor rotates a fixed or variable angle swash plate to drive the hydraulic pump system.

4. The electro-hydrostatic actuator of claim 3, wherein the direction of hydraulic fluid flow is determined by a direction of movement of the fixed or variable angle swash plate and the flow magnitude of the hydraulic fluid into the hydraulic fluid chamber region is controlled by an angle through which the swash plate is tilted.

5. The electro-hydrostatic actuator of claim 4, further including an integrated control module located within the electro-hydrostatic actuator for receiving a control electric signal which controls the direction of movement of the fixed or variable angle swash plate.

6. The electro-hydrostatic actuator of claim 1, wherein the hydraulic pump system comprises a hydraulic pump cylinder block which is rotatable within the electro-hydrostatic actuator, the hydraulic pump cylinder block comprising a plurality of pistons which are coupled to a swash plate.

7. The electro-hydrostatic actuator of claim 6, wherein the plurality of pistons are coupled to the swash plate and slide within the hydraulic pump cylinder block along a direction of a center axis (X) of the electro-hydrostatic actuator.

8. The electro-hydrostatic actuator of claim 1, further comprising a pump housing containing a pump piston and a pump cylinder block.

9. The electro-hydrostatic actuator of claim 8, wherein the pump housing further contains a swash plate.

10. The electro-hydrostatic actuator of claim 8, wherein the pump housing further contains a piston shoe assembly.

11. The electro-hydrostatic actuator of claim 8, wherein the pump housing further contains a first port and a second port.

12. The electro-hydrostatic actuator of claim 1,
    wherein the piston assembly is moved in a first direction from a retracted position to an extended position by pumping hydraulic fluid from at least one of the rod side chamber and from the reservoir into the piston side chamber and pushes fluid from the rod side chamber into the reservoir, and
    wherein the piston assembly is moved in a second direction opposite to the first direction by pumping hydraulic fluid from at least one of the piston side chamber and the reservoir into the rod side chamber and pushing hydraulic fluid from the piston side chamber into the reservoir.

13. The electro-hydrostatic actuator of claim 1, wherein the hydraulic pump system includes a valve plate.

14. The electro-hydrostatic actuator of claim 13, wherein a direction of the hydraulic fluid flow supplied by or returned to the hydraulic pump system is controlled by the valve plate.

15. The electro-hydrostatic actuator of claim 13, wherein the valve plate is mechanically attached to or integral with the hydraulic cylinder body.

16. The electro-hydrostatic actuator of claim 13, wherein the valve plate (212, 101) is rotatable within the hydraulic cylinder body.

17. The electro-hydrostatic actuator of claim 1, wherein the electric motor is a servo motor and the hydraulic pump system is a bi-directional, positive displacement pump.

18. The electro-hydrostatic actuator of claim 17, wherein a position of the piston assembly within the hydraulic cylinder and output force produced by the piston assembly are controlled by modulating one of: a speed of the electric servo motor, a speed of the positive displacement pump, or a combination thereof.

19. The electro-hydrostatic actuator of claim 17, wherein a position of the piston assembly and output force are controlled by changing a speed and direction of the servo motor.

20. The electro-hydrostatic actuator of claim 1, wherein the flow control network is integrated into the hydraulic cylinder body.

21. The electro-hydrostatic actuator of claim 1, further comprising a thermal management system, the thermal management system disposed to surround thermal hot spots on an outer periphery of the actuator.

22. The electro-hydrostatic actuator of claim 1, further comprising a position sensor that monitors a position of the actuator, wherein at least one of a speed and a direction of the electric motor is controlled according to the position of the actuator.

23. An integrated accumulator and manifold system of a hydrostatic actuator comprising:
an inner surface surrounding an outer periphery of a housing of a hydraulic cylinder, the hydraulic cylinder including a piston assembly having a piston head and a piston rod extending from the piston head, the housing including a hydraulic fluid chamber region including a piston side chamber and a rod side chamber;
an outer surface defining a reservoir between the inner surface and the outer surface, wherein the reservoir is in fluid communication with the hydraulic fluid chamber region, wherein the reservoir is configured to surround an outer periphery of the hydraulic fluid chamber region and is subdivided into a first and a second pressure chambers by a bellow assembly, wherein the first pressure chamber includes a first gas pressure chamber, wherein the second pressure chamber includes a fluid pressure chamber, wherein the bellow assembly includes a third pressure chamber different from the first and second pressure chambers, wherein the third pressure chamber includes a second gas pressure chamber separate from the first gas pressure chamber; and
a fluid flow control network in fluid communication with a hydraulic pump system of the actuator for controlling a direction and flow magnitude of hydraulic fluid within the hydraulic fluid chamber region, wherein the hydraulic pump system moves hydraulic fluid in the reservoir and the hydraulic fluid chamber region, wherein the flow control network includes a first fluid passage and a second fluid passage separated by a check valve and an anti-cavitation valve, the check valve and anti-cavitation valve configured to restrict uncontrolled fluid flow between the first fluid passage and the second fluid passage, wherein the anti-cavitation valve is further configured to reduce cavitation damage to the hydraulic pump system.

24. The integrated accumulator and manifold system of claim 23, wherein the fluid flow control network comprises a valve plate disposed interfacing the hydraulic pump system, the hydraulic fluid chamber region, and the reservoir.

25. The integrated accumulator and manifold system of claim 24, wherein the valve plate is operated to control a direction of a fluid flow from or to the hydraulic pump system without changing a direction of a motor which drives the hydraulic pump system.

26. The integrated accumulator and manifold system of claim 23, wherein the integrated accumulator and manifold system is integrated within the hydrostatic actuator.

27. An aircraft having an electro-hydrostatic actuator comprising:
a piston assembly having a piston head and a piston rod extending from the piston head;
a hydraulic cylinder, wherein the piston assembly is located and movable within the hydraulic cylinder, the hydraulic cylinder including a hydraulic fluid chamber region including a piston side chamber and a rod side chamber;
a reservoir for storing hydraulic fluid located within the electro-hydrostatic actuator which is in fluid communication with the hydraulic fluid chamber region, wherein the reservoir is configured to surround an outer periphery of the hydraulic fluid chamber region and is subdivided into a first pressure chamber and a second pressure chambers by a bellow assembly,
wherein the first pressure chamber includes a first gas pressure chamber,
wherein the second pressure chamber includes a fluid pressure chamber,
wherein the bellow assembly includes a third pressure chamber, different from the first pressure chamber and the second pressure chamber, and
wherein the third pressure chamber includes a second gas pressure chamber separate from the first gas pressure chamber;
a hydraulic pump system for moving hydraulic fluid in the reservoir and the hydraulic fluid chamber region, the hydraulic pump system in fluid communication with a flow control network in a hydraulic cylinder body for controlling a direction and flow magnitude of hydraulic fluid within the hydraulic fluid chamber region, wherein the flow control network includes a first fluid passage and a second fluid passage separated by a check valve and an anti-cavitation valve, the check valve and anti-cavitation valve configured to restrict uncontrolled fluid flow between the first fluid passage and the second fluid passage, wherein the anti-cavitation valve is further configured to reduce cavitation damage to the hydraulic pump system; and
an electric motor located within the electro-hydrostatic actuator for driving the hydraulic pump system.

28. The aircraft of claim 27, wherein the electro-hydrostatic actuator further comprises an integrated control module located within the electro-hydrostatic actuator for receiving a control signal and converting the control signal into a set-point value at which the electric motor drives the hydraulic pump system.

29. The aircraft of claim 27, wherein the electric motor rotates a fixed or variable angle swash plate to drive the hydraulic pump system.

30. The aircraft of claim 27, wherein the direction of hydraulic fluid flow is determined by a direction of movement of the fixed or variable angle swash plate and the flow magnitude of the hydraulic fluid into the hydraulic fluid chamber region is controlled by an angle through which the swash plate is tilted.

31. The aircraft of claim 27, wherein the electro-hydrostatic actuator further comprises a pump housing containing a pump piston and a pump cylinder block.

32. The aircraft of claim 27,
wherein the piston assembly is moved in a first direction from a retracted position to an extended position by pumping hydraulic fluid from at least one of the rod side chamber and from the reservoir into the piston side chamber and pushing fluid from the rod side chamber into the reservoir, and
wherein the piston assembly is moved in a second direction opposite to the first direction by pumping hydraulic fluid from at least one of the piston side chamber and the reservoir into the rod side chamber and pushing fluid from the piston side chamber into the reservoir.

33. The aircraft of claim 27, wherein the electric motor is a servo motor and the hydraulic pump system is a bi-directional, positive displacement pump.

34. The aircraft of claim 27, wherein the electro-hydrostatic actuator further comprises a valve plate rotatable within the hydraulic cylinder body.

\* \* \* \* \*